(12) United States Patent
Geisler et al.

(10) Patent No.: US 6,882,906 B2
(45) Date of Patent: Apr. 19, 2005

(54) VEHICLE INFORMATION AND INTERACTION MANAGEMENT

(75) Inventors: Scott P. Geisler, Clarkston, MI (US); Thomas William Creech, Clarkston, MI (US); Arne Nabo, Trollhattan (SE); Brian S. Repa, Beverly Hills, MI (US)

(73) Assignees: General Motors Corporation, Detroit, MI (US); Saab Automobile AB, Trollhatan (SE)

( * ) Notice: Subject to any disclaimer, the term of this patent is extended or adjusted under 35 U.S.C. 154(b) by 60 days.

(21) Appl. No.: 10/285,317

(22) Filed: Oct. 31, 2002

(65) Prior Publication Data

US 2004/0088084 A1 May 6, 2004

(51) Int. Cl.[7] .............................................. G06F 7/00
(52) U.S. Cl. ....................... 701/1; 701/36; 342/357.09
(58) Field of Search .............................. 701/1, 31, 33, 701/36; 342/357.09; 340/539.17

(56) References Cited

U.S. PATENT DOCUMENTS

| | | | |
|---|---|---|---|
| 5,450,321 A | 9/1995 | Crane | 364/424.04 |
| 5,617,325 A | 4/1997 | Schaefer | 716/6 |
| 5,774,367 A | 6/1998 | Reyes et al. | 716/2 |
| 5,796,624 A | 8/1998 | Sridhar et al. | 703/14 |
| 6,009,355 A | 12/1999 | Obradovich et al. | 701/1 |
| 6,330,499 B1 * | 12/2001 | Chou et al. | 701/33 |

FOREIGN PATENT DOCUMENTS

| | | |
|---|---|---|
| DE | 197 55 686 | 6/1999 |
| FR | 2 778 261 | 11/1999 |

* cited by examiner

Primary Examiner—Gertrude A. Jeanglaude
(74) Attorney, Agent, or Firm—Kathryn A. Marra

(57) ABSTRACT

A method for vehicle information and interaction management. The method comprises receiving vehicle feature data and driver preference data. The method also comprises receiving a driving workload estimate that is indicative of current and previously occurring conditions. A subroutine corresponding to at least one of the vehicle feature data is executed. The subroutine initiates the activation or disablement of a function of a vehicle and is responsive to the driver preference data and the driving workload estimate.

24 Claims, 2 Drawing Sheets

| Function Description | Max. WL level where item is NOT managed |
|---|---|
| 202 { Automatic (vehicle generated) EMERGENCY call | NONE |
| Manually generated EMERGENCY call | |
| Collision Avoidance Warnings | |
| Critical Safety Messages (Ex: Brakes, Engine Overheated) | |
| 204 { Safety System Status Messages (Ex: ABS inoperative, note: Brakes still function here) | 90 |
| Vehicle Warning Messages (Ex: Engine Temperature, note: prior to Overheat) | |
| Navigation Turn-by-turn Instructions (General way-finding Instructions) | |
| 206 { Detailed Navigation Instructions (Ex: Intersection/Interchange detail) | 80 |
| 208 { Telephonic Interaction w/ Operator-assisted Service Center | 70 |
| 210 { Operationally Significant Vehicle System Status (Ex: Low Fuel) | 60 |
| Navigation Point-of-Interest search/display (find nearest gas station) | |
| "Basic" Telephonic Interaction w/ an automated Service Center | |
| Speech-Interface cellular phone activities | |
| 212 { Navigation Map Interactions | 50 |
| "Involved" Telephonic Interaction w/ an automated Service Center | |
| 214 { Voice-guided server browsing | 40 |
| Text-to-Speech read-back of E-Mail | |
| 216 — Manual interface w/ cellular pad (keypad) | 30 |
| 218 — Voice directed composition of E-Mail | 20 |
| 220 — Manual composition of E-Mail | 10 |

*FIG. 2*

VEHICLE INFORMATION AND INTERACTION MANAGEMENT

BACKGROUND OF THE INVENTION

The present disclosure relates generally to vehicle information and interaction management and in particular, to a method of managing message delivery and access to vehicle features and functions based on a driving workload estimate.

Vehicles, such as automobiles, generally feature one or more displays to provide locally obtained information related to a current state of the vehicle. The display is positioned within the vehicle such that a driver of the vehicle may view information while driving the vehicle. For example, the display may provide information on a windshield, a dashboard or a steering wheel. Each display may contain one or more windows. Locally obtained information, such as the speed of the vehicle, the direction traveled by the vehicle, the outside air temperature, whether the air conditioner is in use, whether the hazard light is on, a fuel status of the vehicle, and the like, may be provided in these windows. In addition, information can be collected from vehicle sensors and used to create vehicle status and maintenance messages for display in the windows. These messages can include information such as "window washer fluid low" and "check tire pressure."

The current displays in vehicles are capable of providing different types of media from a variety of sources. The display may provide audio, text, graphic images, and/or video (e.g., night vision display). Additionally, the display may provide information from various databases and remote servers using a wireless network. For example, traffic and/or weather alerts may be communicated through any of the display means mentioned above. In addition, smart advertising may be transmitted to the display to inform the driver of a nearby restaurant or store. Providing all of these types of information and media may be helpful to the driver but providing it without considering the current driving situation may result in increased driver workload, driver distraction and/or decreased driving performance.

BRIEF DESCRIPTION OF THE INVENTION

The above discussed and other drawbacks and deficiencies of the prior art are overcome or alleviated by a method for vehicle information and interaction management. In an exemplary embodiment, the method comprises receiving vehicle feature data and driver preference data. The method also comprises receiving a driving workload estimate that is indicative of current and previously occurring conditions. A subroutine corresponding to at least one of the vehicle feature data is executed. The subroutine initiates the activation or disablement of a function of a vehicle and is responsive to the driver preference data and the driving workload estimate.

In another aspect, a system for vehicle information and interaction management comprises a network and a microprocessor in communication with the network. The microprocessor includes instructions to implement a method comprising receiving vehicle feature data and driver preference data from the network. The method also comprises receiving a driving workload estimate that is indicative of current and previously occurring conditions. A subroutine corresponding to at least one of the vehicle feature data is executed. The subroutine initiates activation or disablement of a function of a vehicle and is responsive to the driver preference data and the driving workload estimate.

In a further aspect, a computer program product for vehicle information and interaction management comprises a storage medium readable by a processing circuit and storing instructions for execution by the processing circuit for performing a method comprising receiving vehicle feature data and driver preference data. The method also comprises receiving a driving workload estimate that is indicative of current and previously occurring conditions. A subroutine corresponding to at least one of the vehicle feature data is executed. The subroutine initiates activation or disablement of a function of a vehicle and is responsive to the driver preference data and the driving workload estimate.

BRIEF DESCRIPTION OF THE DRAWINGS

Referring to the exemplary drawings wherein like elements are numbered alike in the several FIGURES:

FIG. 2 is a hierarchical table that can be used by an embodiment of the present invention to determine access to vehicle functions.

DETAILED DESCRIPTION OF THE INVENTION

Figure 1:
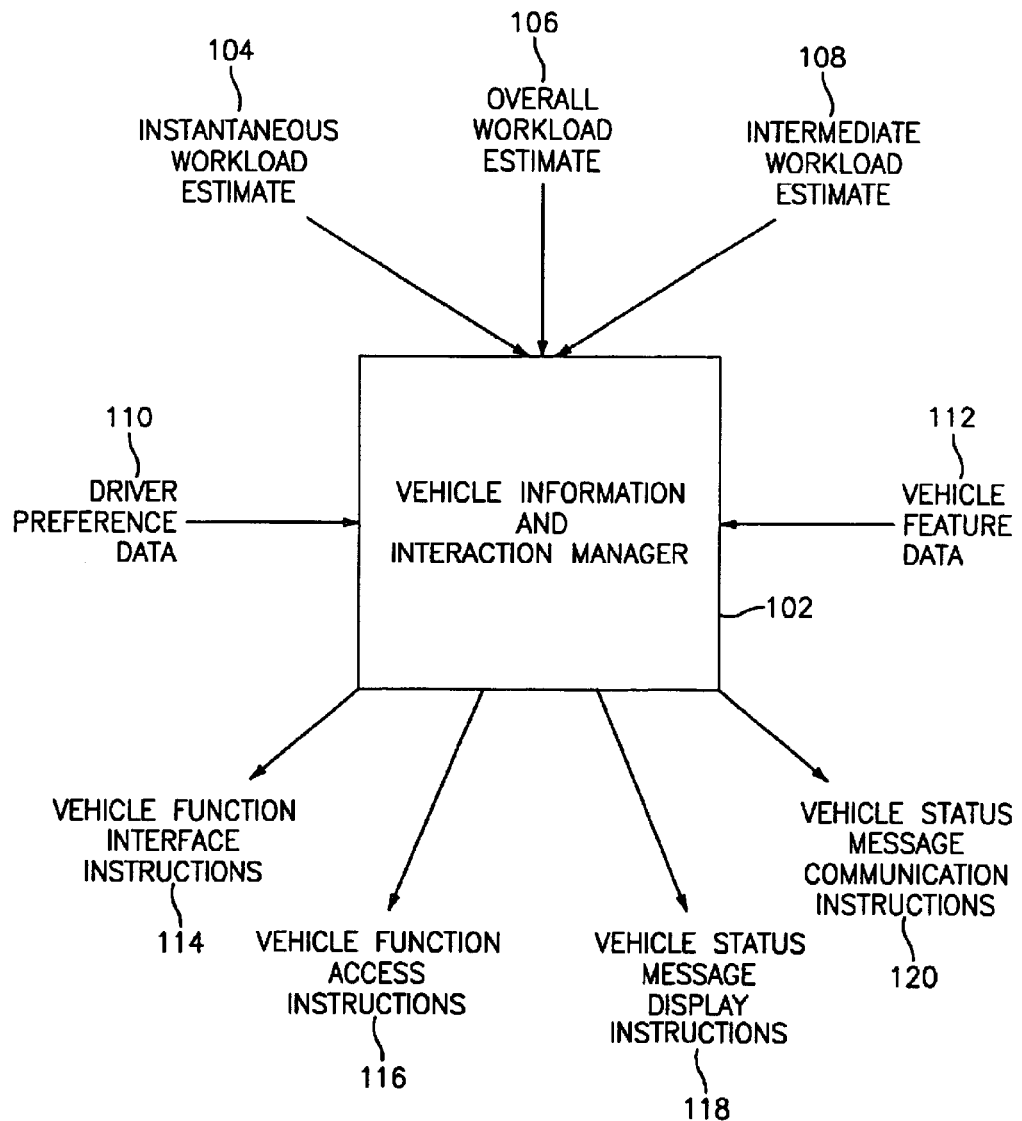
FIG. 1 is a block diagram of an exemplary system for performing vehicle information and interaction management.

A method of vehicle information and interaction management is presented. Briefly stated, the method weighs the estimated driving workload before displaying vehicle status messages and before allowing functions of the vehicle to be engaged. A driving workload estimate is input to the vehicle information and interaction manager. The driving workload estimate may include one or more inputs to represent vehicle and driving conditions. The driving workload estimate reflects both current and previously occurring conditions. The driving workload estimate is updated on a periodic basis (e.g., every second). Driver preference data and vehicle feature data are also input to the vehicle information and interaction manager. The vehicle information and interaction manager processes these inputs and initiates actions within the vehicle that affect vehicle messages, features and functions. These actions may include the timing of vehicle messages (e.g., message delay, message postponement), modification of the message presentation modality, feature or function access being disabled and modification of feature or function access.

FIG. 1 is a block diagram of an exemplary system for performing vehicle information and interaction management. An instantaneous workload estimate 104, an intermediate workload estimate 108 and an overall workload estimate 106, referred to collectively as a driving workload estimate, are input to a vehicle information and interaction manager 102. Also input to the vehicle information and interaction manager 102 is driver preference data 110 and vehicle feature data 112. The vehicle information and interaction manager 102 includes application code for creating vehicle function interface instructions 114, vehicle function access instructions 116, vehicle status message display instructions 118 and vehicle status message communication instructions 120.

The vehicle information and interaction manager 102 is located on a microprocessor contained in the vehicle. The microprocessor may be dedicated to performing vehicle information and interaction manager 102 functions or, alternatively, the microprocessor may include application code for performing other vehicle functions along with the vehicle information and interaction manager 102 functions. Storage space for intermediate application results as well as application inputs and outputs can be located on the microprocessor or located on an external storage device accessible by the microprocessor. In addition, the microprocessor may be attached to a network that can provide communication internal to the vehicle, or in an alternate embodiment, communication with devices that are external to the vehicle as well.

The instantaneous workload estimate 104, intermediate workload estimate 108 and overall workload estimate 106 are expressed as numeric values and reflect relative workload levels. For example, the numeric value may range from one to one-hundred and the workload level may be measured relative to a reference state, such as a vehicle that is not moving or a vehicle where the ignition is not engaged. A new driving workload estimate is received on a periodic basis from a workload estimation system. The instantaneous workload estimate 104 reflects driving conditions based on a short time frame (e.g., the preceding zero to three seconds). For example, the act of turning the vehicle would have an impact on the instantaneous workload because it would add to the current driving workload and because turning is generally completed in a few seconds. The intermediate workload estimate 108 reflects driving conditions based on an intermediate time interval (e.g., the previous three seconds to three minutes) and can value the impact of states that continue to effect driving conditions or performance even after they are no longer present. For example, if the input data indicates that the driver has just completed a merge into traffic or exited a braking maneuver where the anti-lock brake system (ABS) was activated, the intermediate workload estimate 108 would reflect these events for a specified time interval. An event that affects the intermediate workload estimate 108 includes some recovery time for the driver. The overall workload estimate 106 reflects driving conditions based on a long term workload or the total workload accumulated during an ignition cycle. For example, the length of time that the driver has been operating the vehicle may have been factored into the overall workload estimate 106.

The driver preference data 110 may be used to set the level of management performed by the vehicle information and interaction manager 102. For example, the driver preference data could indicate a request for aggressive management, neutral management or minimal management. The neutral management could be set to display the "headlamp failed" message at moderate workload levels (e.g., three or lower on a five point scale) and an aggressive management setting might display the message at a lower workload level (e.g., two or lower on a five point scale). Further, a minimal manager might display the message at a higher level (e.g., four and lower on a five point scale). In this manner individual differences between drivers can be accounted for by the vehicle information and interaction manager 102. The vehicle feature data 112 is a list of the various functions provided in the vehicle and is utilized to initialize the vehicle information and interaction manager 102 for a particular vehicle.

Outputs from the vehicle information and interaction manager 102 include vehicle function interface instructions 114 and vehicle function access instructions 116. The vehicle function interface instructions 114 are used to activate or disable the types of interfaces that are available to particular devices that are attached to the vehicle (e.g., installed in the vehicle or part of the vehicle). Examples of possible interfaces include keypad and voice activation. The vehicle function access instructions 116 are used to activate or to disable particular functions of devices that are attached to the vehicle (e.g., installed in the vehicle or part of the vehicle). The access instructions can activate access to a particular device or disable access to the device. Vehicle status message display instructions 118 are used to activate or to disable particular vehicle status messages. Vehicle status message communication instructions 120 are used to determine the methods of communicating vehicle status messages.

FIG. 2 is a hierarchical table that can be used by the vehicle information and interaction manager 102 in an embodiment of the present invention to determine access to vehicle functions. FIG. 2 includes a table 200 of functions and an associated maximum workload estimate based on a workload estimate scale of one to one-hundred. The maximum workload estimate can be compared to all three components of the driving workload estimate or to a subset of the driving workload estimate data. Functions include vehicle status messages that can be listed individually, grouped together by like function or grouped together as one function, or entry, in the table 200. In addition, a function can be a manner of communicating a vehicle status message such as voice, standard text, bold text and video. Functions can also include access to a device attached to the vehicle or access to particular interfaces associated with a device attached to the vehicle. Devices attached to the vehicle include devices such as cellular phones, navigation devices, car stereo equipment, Internet news devices and electronic mail devices.

For example, the interface to a cellular phone can be managed by the vehicle information and interaction manager 102. The driver of the vehicle may only have access to the keypad on a cellular phone to dial outgoing phone calls and to answer incoming phone calls when the driving workload estimate is low (e.g., less than twenty on a scale of one to one-hundred). The driver may have access to the voice activated functions of the cellular phone until the driving workload estimate gets to a higher level (e.g., sixty on a scale of one to one-hundred). When the driving workload estimate reaches a certain level (e.g., sixty or higher on a scale of one to one-hundred) any use of the cellular phone may be disabled and the driver of the vehicle cannot access any functions associated with the cellular phone. A table, such as the one depicted in FIG. 2 can be used to implement these restrictions based on driving workload estimates.

Referring to FIG. 2, the "manual composition of e-mail" entry 220 is associated with a maximum workload estimate of ten. The vehicle information and interaction manager 102 would use this information to disable access to manual composition of e-mail when the driving workload estimate is higher than ten. The "voice directed composition of e-mail" entry 218 is associated with a maximum workload estimate of twenty. Therefore, the vehicle information and interaction manager 102 would disable access to voice directed composition of e-mail when the driving workload estimate is higher than twenty. The "manual interface with cellular pad" entry 216 is associated with a maximum workload estimate of thirty. Therefore, the vehicle information and interaction manager 102 would disable access to making cellular phone calls on key pads when the driving workload estimate is higher than thirty. Similarly, the "voice guided server browsing" and "text-to-speech read back of e-mail" entries 214 are associated with a maximum workload estimate of forty and would be disabled when the driving workload estimate is higher than forty. The "navigation map interactions" and "involved telephonic interaction with an automatic service center" entries 212 are associated with a maximum workload estimate of fifty and would be disabled when the driving workload estimate is higher than fifty. The "operationally significant vehicle system status", "navigation point-of-interest search/display", "basic telephonic interaction with an automated service center" and "speech interface cellular phone activities" entries 210 are associated with a maximum workload estimate of sixty and would be disabled when the driving workload estimate is higher than sixty. The "telephonic interaction with operator assisted service center" entry 208 is associated with a maximum workload estimate of seventy and would be disabled when the driving workload estimate is higher than seventy.

Also as shown in FIG. 2, the "detailed navigation instructions" entry 206 is associated with a maximum workload estimate of eighty and would be disabled when the driving workload estimate is higher than eighty. Similarly, the "safety system status messages", vehicle warning messages" and "navigation turn by turn instructions" entries 204 are associated with a maximum workload estimate of ninety and would be disabled when the driving workload estimate is higher than ninety. Lastly, the "automatic emergency call", "manually generated emergency call", "collision avoidance warnings" and "critical safety messages" entries 202 do not have a maximum workload level and therefore would never be disabled by the vehicle information and interaction manager 102. The functions, groupings and maximum workload levels depicted in FIG. 2 are intended to be illustrative of the types of functions and associated workload levels that could be implemented using an embodiment of the present invention. A typical implementation of the vehicle information and interaction manager 102 would include many more functions than those illustrated in FIG. 2 and would be tailored for a particular vehicle. The tailoring could include different maximum workload levels and the use of a different scale for the workload estimates.

In an exemplary embodiment of the present invention, each function, such as those depicted in FIG. 2, can be associated with a subroutine for determining whether to activate or disable the function. The subroutine is part of the vehicle information and interaction manager 102 application code. For example, one of the functions may be a blinking display of the vehicle status message "low oil." A subroutine associated with this function could be called to determine if the blinking status message should be displayed. The subroutine could look at the overall workload estimate 106 and activate the message, or function, if the overall workload estimate is over a particular value (e.g., seventy on a scale of one to one hundred). This could be done because if the overall workload estimate 106 is causing the driving workload estimate to be over the threshold, the driving workload estimate might remain over the threshold until the ignition is turned off and it might make sense to display the message. However, the subroutine may check the instantaneous workload estimate 104 and the intermediate workload estimate 108 and disable the "low oil" message if one is over a pre-selected threshold and the overall workload estimate 106 is below a pre-selected threshold. In this way the functions can be activated and disabled by analyzing the three components of the driving workload estimate: the instantaneous workload estimate 104, the overall workload estimate 106 and the intermediate workload estimate 108.

In addition, the use of a subroutine can take into account driver preference data 110, vehicle data (e.g., wiper status, vehicle speed, oil level data and turn signal data), environment data (e.g., outside air temperature and side collision warning data) and current condition data (e.g., are radio controls being manipulated) to perform further analysis before making a determination about whether a function should be disabled or activated. For example, a subroutine can contain logic to disable a low washer fluid message if the driving workload estimate is above a pre-selected level and the wipers are not currently in use. Another example of using additional input is disabling a voice message to warn the driver of an object located behind the vehicle until the vehicle is in reverse gear. In this manner, the subroutines can be utilized to tailor the vehicle information and interaction manager 102 based on implementation requirements and available input data.

The disclosed invention provides the ability to weigh the estimated driving workload before displaying vehicle status messages and before allowing functions of devices in the vehicle to be activated. The vehicle information and interaction manager 102 can be tailored based on three estimated workload levels, based on driver preference data, and based on a variety of vehicle and environment inputs. Staging the vehicle status messages presented to the driver can result in better communication with the driver and in higher driver satisfaction with the vehicle. The driver is not bombarded with every vehicle status message that applies at every minute but instead can be presented with vehicle status messages in a controlled manner. In addition, the ability to disable particular functions of devices in the vehicle from being engaged based on an estimated driving workload and other inputs can lead to less distracted drivers.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. An embodiment of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for vehicle information and interaction management, said method comprising:
   receiving vehicle feature data and driver preference data;
   receiving a driving workload estimate, said driving workload estimate indicative of current and previously occurring conditions; and
   executing a subroutine for at least one of said vehicle feature data, said subroutine being responsive to said driver preference data and said driving workload estimate to initiate the activation or disablement of a function of a vehicle.

2. The method of claim 1 wherein said driving workload estimate includes an instantaneous workload estimate.

3. The method of claim 1 wherein said driving workload estimate includes an intermediate workload estimate.

4. The method of claim 1 wherein said driving workload estimate includes an overall workload estimate.

5. The method of claim 1 wherein said function includes a vehicle status message.

6. The method of claim 5 wherein said disablement includes delaying a display of said message and said activation includes displaying said message.

7. The method of claim 1 wherein said function includes a manner of communicating a vehicle status message.

8. The method of claim 7 wherein said manner of communicating is display, voice or video.

9. The method of claim 1 wherein said function includes access to a device attached to said vehicle.

10. The method of claim 9 wherein said device is a cellular telephone, a stereo, an internet news device, an electronic mail device or a navigation device.

11. The method of claim 1 wherein said function is an interface to a device attached to said vehicle.

12. The method of claim 11 wherein said device is a cellular telephone, a stereo, an internet news device, an electronic mail device or a navigation device.

13. The method of claim 11 wherein said device is a cellular telephone and said interface is a keypad interface or a speech interface.

14. The method of claim 1 further comprising receiving internally generated vehicle data and wherein said subroutine is further responsive to said vehicle data.

15. The method of claim 1 further comprising receiving environment data and wherein said subroutine is further responsive to said environment data.

16. The method of claim 1 further comprising receiving current condition data and wherein said subroutine is further responsive to said current condition data.

17. The method of claim 1 further comprising receiving telematic data and wherein said subroutine is further responsive to said telematic data.

18. A system for driving workload estimation, the system comprising:

a network; and a microprocessor in communication with said network, said microprocessor including instructions to implement:

receiving vehicle feature data and driver preference data from said network;

receiving a driving workload estimate from said network, said driving workload estimate indicative of current and previously occurring conditions; and executing a subroutine for at least one of said vehicle feature data, said subroutine being responsive to said driver preference data and said driving workload estimate to initiate activation or disablement of a function of a vehicle.

19. The system of claim 18 wherein said driving workload estimate includes an instantaneous workload estimate.

20. The system of claim 18 wherein said driving workload estimate includes an intermediate workload estimate.

21. The system of claim 18 wherein said driving workload estimate includes an overall workload estimate.

22. The system of claim 18 wherein said network is a wireless network.

23. The system of claim 18 wherein said network in the Internet.

24. A computer program product for driving workload estimation, the product comprising:

a storage medium readable by a processing circuit and storing instructions for execution by the processing circuit for performing a method comprising:

receiving vehicle feature data and driver preference data;

receiving a driving workload estimate, said driving workload estimate indicative of current and previously occurring conditions; and executing a subroutine for at least one of said vehicle feature data, said subroutine being responsive to said driver preference data and said driving workload estimate to initiate activation or disablement of a function of a vehicle.

* * * * *